United States Patent

Kroll et al.

[15] 3,691,095

[45] Sept. 12, 1972

[54] CATALYST FOR OLEFIN REACTIONS

[72] Inventors: Wolfram R. Kroll; Gerald Doyle, both of Somerville, N.J. 08876; Helmut W. Ruhle, Edison, N.J. 08817

[73] Assignee: Esso Research and Engineering Company

[22] Filed: Sept. 16, 1970

[21] Appl. No.: 72,837

[52] U.S. Cl. ............252/428, 252/429 B, 252/431 R, 252/431 N, 252/431 P, 260/683 D
[51] Int. Cl. .................................................C07c 3/62
[58] Field of Search ...252/431, 431 N, 431 P, 429 B, 252/428; 260/683 D

[56] References Cited

UNITED STATES PATENTS

| 3,474,117 | 10/1969 | Tedeschi et al. ....252/431 R X |
| 3,558,515 | 1/1971 | Kittleman et al. ...252/431 P X |
| 3,558,518 | 1/1971 | Zuech................252/431 N X |

Primary Examiner—Patrick P. Garvin
Attorney—Chasan and Sinnock and John P. Corcoran

[57] ABSTRACT

A process for preparing a catalyst which comprises contacting a polynuclear transition metal carbonyl complex having the general formula

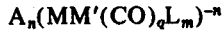

$$A_n(MM'(CO)_q L_m)^{-n}$$

wherein A is a cation selected from the group consisting of alkali metals and cations having the general formula $D_4Q$ wherein D is selected from a group consisting of $C_1-C_{20}$ hydrocarbyl radicals and halogenated derivatives thereof and Q is selected from the group consisting of nitrogen, phosphorus and arsenic; M is a Group VI-B metal; M' is a metal selected from the group consisting of Group VI-B and Group VII transition metals; L is a unidentate or bidentate ligand selected from the group consisting of CO, $NH_3$, hydrazine, phenylhydrazine, cyclohexylamine, a butylamine, dimethylamine, aniline, diethylamine, pyridine, 2,6-dimethylpyridine, triphenylarsine, tributylstibine, triphenylstibine, dimethylsulfoxide, dimethylcyanamide, N-cyanopiperidine, triphenylphosphine imine, ethylenediamine, tetramethylethylenediamine 2,2'-dipyridyl, 1,10-phenanthroline, 2,7-dimethyl-1,8-naphthyridine, piperidine, piperazine, acetonitrile, propionitrile, acrylonitrile, triphenylphosphine, triphenylphosphine oxide, triphenyl phosphite, tricyclohexylphosphine triphenylarsine, tri(p-tolyl)arsine, tetramethyldiphosphine, 1,2-bis(diphenylphosphino) ethane, 1,2-bis(diphenylarsino)ethane, O-phenylene bis(dimethylarsine), diethylenetriamine, bis(2-methoxyethyl)ether, 2,5,8-trithianonane, tris(diphenylphosphinomethyl)ethane, and tetrakis(diphenylphosphinomethyl)methane; q is an integer of from 0 to 14; m is an integer varying from 0 to 2, and wherein L must be CO when q is equal to 0; n is an integer of from 1 to 2 and equal to the valence of the carbonyl anion; with an ionic compound of the type RX wherein X is a halide and R is selected from the group consisting of compounds having the general formula $D_4Q$ wherein D is selected from the group consisting of $C_1-C_{20}$ hydrocarbyl radicals and halogenated derivatives thereof and Q is nitrogen, phosphorus or arsenic, and an organometallic activator, said organometallic activator comprising organoaluminum halides selected from the group consisting of compounds having the general formulas $R'AL_2$ and $R'_3AL_{2ba}Y_3$ wherein R' is selected from the group consisting of hydrogen and $C_1-C_{20}$ hydrocarbyl radicals and $C_1-C_{20}$ oxyhydrocarbyls and wherein at least one R' is a hydrocarbyl radical, and Y is a halide, said contacting taking place at a temperature from −35 to 100°C and a pressure of from about 0.01 atmospheres to 500 atmospheres, the atomic ratio of the metal of the organometallic activator to the Group VI-B metal of the metallic complex varying from about 20:1 to 1:1 and the molar ratio of the Group VI-B metal to said ionic compound varying from 10:1 and 0.1:1, whereby a catalyst is formed. Catalysts prepared by the above process are especially effective as olefin disproportionation catalysts.

8 Claims, No Drawings

CATALYST FOR OLEFIN REACTIONS

BACKGROUND OF THE INVENTION

This invention relates to a novel process for producing a unique polynuclear transition metal carbonyl catalyst, said catalyst being especially effective for the disproportionation of unsaturated compounds.

The term disproportionation reaction means those reactions in which one or more unsaturated compounds are transformed into other unsaturated compounds of different molecular weights. Preferentially, this reaction is carried out with one or more olefins The reaction can be regarded as consisting of the breaking of the double bonds of the reaction olefins and the recombination of the resulting fragments in such a manner that new olefinic products will result.

In the past a variety of catalysts had been utilized for this purpose. Typical of such catalysts is a catalyst comprising a group VIB metal complex represented by the formula $[(L)_a M_b Z_c]_x$ wherein each (L) is a CO, $R_3Q$, $R_3QO$, $R_2Q-QR_2$ or $R^2(COO)_m$ ligand, each Z is a halogen or CN, SCN, OCN, or $SnCl_3$ radical; M is Mo, W, MOO, $MOO_2WO$, $WO_2$ preferably Mo or W; Q is phosphorous, arsenic, or antimony; $a$ is 1–6, $b$ is 1–2, generally 1, $c$ is 0–5, and the number of (L) and Z groups present in the complex is not greater than the number required for the metal to achieve the closed shell electronic configuration of the next higher atomic number inert gas; $x$ is a number, generally 1, representing the polymeric state of the complex; R is an aromatic or saturated aliphatic hydrocarbon radical, including alkoxy and halo derivatives thereof, having up to 20 carbon atoms; $m$ is 1 or 2; $R^2$ is an aromatic, saturated aliphatic, or ethylenically unsaturated hydrocarbon radical having up to 30 carbon atoms, $R^2$ being monovalent when $m$ is 2; reacted with an organometallic reducing agent.

Variations on the above catalyst are also known in which Group VII metals are utilized as well as Group VIII metals. Although these catalysts have proven to be somewhat successful in the disproportionation of olefins their acceptance has been hindered by the difficulty and expense associated with their production. In addition, many of these catalysts have not shown great activity particularly at lower temperatures, i.e., temperature in the range of −25° to 40°C.

Heterogeneous catalysts which have been utilized for olefin disproportionation in the past have had only limited success as indicated by their relatively low activities and selectivities and the requirement that the reactions must be carried out in the vapor state.

SUMMARY OF THE INVENTION

According to this invention, it has unexpectedly been found that novel catalysts, which result from contacting polynuclear transition metal carbonyl complex salts, wherein said polynuclear transition metal carbonyl complex is the anion of the salt, having the general formula:

$$A^+_n [M M'(CO)_q L_m]^n$$

wherein $A^+$ is a cation; M is a Group VI transition metal, M' is a Group VI or Group VII transition metal, and M and M' may be the same or different; L is a unidentate or bidentate ligand; $n$ represents the charge of the polynuclear transition metal carbonyl anion; $m$ may vary from 0 to 2; and $q$ may vary from 0 to 14, with an ionic compound of the type RX; wherein R is a cation and X is a uninegatively charged anion, and an organometallic activator, said organometallic activator comprising organo-aluminum halides, preferentially selected from the group consisting of compounds represented by the general formulas:

$$R'AlY_2 \text{ and } R'_3Al_2Y_3$$

wherein R' is a hydrogen, aryl or alkyl radical and Y is a halide, are especially active in disproportionation reactions.

Typical ligands which may be utilized for L are as follows: CO, $NH_3$, hydrazine, phenylhydrazine, cyclohexylamine, n-butylamine, dimethylamine, aniline, diethylamine, pyridine, 2,6-dimethylpyridine, triphenylarsine, tributylstibine, triphenylstibine, dimethylsulfoxide, dimethylcyanamide, N-cyanopiperidine, triphenylphosphine imine, ethylenediamine, tetramethylethylenediamine, 2,2'-dipyridyl, 1,10-phenanthroline, 2,7-dimethyl-1,8-naphthyridine, piperidine, piperazine, acetonitrile, propionitrile, acrylonitrile, triphenylphosphine, triphenylphosphine oxide, triphenyl phosphite, tricyclohexylphosphine, triphenylarsine, tri(p-tolyl)arsine, tetramethyldiphosphine, 1,2-bis(disphenylphosphino) ethane, 1,2-bis(diphenylarsino)ethane, O-phenylene bis(dimethylarsine), diethylenetriamine, bis(2-methoxyethyl)ether, 2,5,8-trithianonane, tris(diphenylphosphinomethyl)ethane, tetrakis-(diphenylphosphinomethyl)methane, etc. When $q$ is 0, then L must equal CO, as is inherent in the definition of the above complex as a carbonyl complex.

M is a Group VI transition metal, preferably selected from the group consisting of Mo and W. M' is selected from the group consisting of Group VI and Group VII transition metals, and can be the same as or different than M. M' is preferably Mo, Mn or Re. Specific examples of the polynuclear transition metal carbonyl complex anions of the above-mentioned salt, within the scope of the instant invention, include:

$[Mo_2(CO)_{10}]^{2-}$; $[W_2(CO)_{10}]^{2-}$
$[Cr_2(CO)_{10}]^{2-}$; $[Mo\,Mn(CO_{10})]^-$; $[Mo\,Re(CO)_{10}]^-$;
$[W-Re(CO)_{10}]^-$

The catalyst of the instant invention include not only dinuclear transition metal carbonyl complex salts but more broadly polynuclear transition metal carbonyl complex salts of the type:

$$A_n^+ [M_o M_p'(CO)_q Z_r L_m]^{n-}$$

wherein $A^+$ is a cation; n represents the charge of the anion; M and M' are transition metals and may be the same or different; M is Group VI transition metal, M' can also be a Group VI transition metal or a Group VII or Group VIII transition metal, preferentially M is Mo and M' is either Group VI, e.g., Mo or Group VII, e.g. Re; zero ≦ 0<5; zero ≦ p<5; 1<q<20; 6<r ≧ zero; $m$ may vary from zero to 5; Z represents a unidentate ligand, e.g., hydride, halide, pseudohalide, alkoxy, amido, cyclopentadienyl, etc; and L may be a unidentate or a polydentate ligand of the Lewis base type, e.g., a phosphine, an amine, a stibine, an arsine, an ether, etc. Typical ligands which may be utilized include: trimethylamine, triethylamine, tetramethylethylene-diamine, triethylstibine, tributylphosphine, triphenylphosphine, ethylether, tetrahydrofuran, p-dioxane, etc. Non-limiting examples of the polynuclear transition metal carbonyl complex anions are:

[Mo$_2$(CO)$_{14}$]$^+$ ; [Mo$_3$(CO)$_{14}$]$^{2-}$ ; [Cr$_3$(CO)$_{14}$]$^{2-}$
[Mo$_2$H(CO)$_{10}$] ; [CrMoH(CO)$_{10}$]$^-$ ;
[MoWH(CO)$_{10}$]$^-$ ; [WMn(CO)$_{10}$]$^-$ ; [WRe(CO)$_{10}$]$^-$ ;
[Mo$_2$(CO)$_8$(P(C$_6$H$_5$)$_3$)$_2$]$^{2-}$

A is a cation selected from the group consisting of alkali metal cations, e.g., sodium, potassium and compounds having the general configuration D$_4$Q, wherein the four D's are independently selected from the group consisting of C$_1$ through C$_{20}$ hydrocarbyl radicals preferably C$_1$ through C$_{20}$ aliphatic radicals, C$_6$ through C$_{20}$ aryl radicals, C$_3$ through C$_{20}$ cycloalkyl radicals, C$_2$ through C$_{20}$ alkenyl radicals, C$_3$ through C$_{20}$ cycloalkenyl radicals; and halogenated derivatives thereof; and Q is nitrogen, phosphorous or arsenic.

RX is an ionic compound preferably an ionic halide that is at least partially soluble in the reaction mixture under reaction conditions, and is selected from the group consisting of compounds wherein R has the general formula D$_4$Q, wherein D is a C$_1$–C$_{20}$ hydrocarbyl radical preferably selected from the group consisting of C$_1$ through C$_{20}$ aliphatic radicals, C$_6$ through C$_{20}$ aryl radicals, C$_3$ through C$_{20}$ cycloalkyl radicals, C$_2$ through C$_{20}$ alkenyl radicals, C$_3$ through C$_{20}$ cycloalkenyl radicals; and halogenated derivatives thereof. Q is nitrogen, phosphorus or arsenic; and Q may also be incorporated into a saturated, unsaturated or aromatic ring system, e.g., as in pyridinium salts, X is a uninegatively charged anion, preferably halogen, e.g., chlorine. Specific examples of the ionic compound, RX, which are preferred are as follows: tetra-n-butylammonium chloride, tetra-n-propylammonium chloride, tetra-n-butylammonium bromide, tri-caprylmethylammonium chloride, tri-n-propylphenylammonium chloride, N-dihexylpiperidinium chloride, N-octylpyridinium chloride, N-dibutylcyclohexylammonium chloride, tetra-n-butylphosphonium chloride, tetraphenylphosphonium chloride, tetraphenylarsonium chloride, and mixtures thereof.

Preferred organometallic activators are aluminum derivatives of the formula R'AlY$_2$ and R'$_3$Al$_2$Y$_3$ wherein R' is selected from the group consisting of hydrogen and C$_1$–C$_{20}$ hydrocarbyl radicals, including oxyhydrocarbyls, e.g., alkoxides preferably alkyl radicals, wherein at least one R' is a hydrocarbyl radical; and Y is a halide. More preferably alkyl aluminum halides are employed as the activating agent. Alkyl radicals of 1–12 carbon atoms are most preferred. The preferred halides are Cl or Br with Cl being the most preferred. Thus, compounds such as methylaluminum dichloride, ethylaluminum dichloride, isobutylaluminum dichloride, methylaluminum sesquichloride, etc. may be employed. The most preferred compounds, which appear to give the best catalysts are however methylaluminum dichloride and methylaluminum sesquichloride.

It should be noted that organometallic compounds of Group I and II metals are also useful as activators within the scope of the instant invention.

None of the three individual components of the instant catalyst would individually show catalytic activity for the disproportionation of olefins. A mixture of the second and third component is catalytically inactive, too. A mixture of the first and third components, the polynuclear transition metal carbonyl complex salt and the organometallic activator may in some cases show catalytic activity which is, however, low and a considerable amount of isomerization will frequently be observed. It is thus found that the ionic compound RX, is an essential part of the catalytic system when high yields of olefinic disproportionation products and low amounts of isomerization products are desired.

In combining the various components of the catalytic system, atomic ratios of the organometallic activator to the chromium, molybdenum or tungsten of the Group VI-B metal of the polynuclear transition metal carbonyl compound should be between 20:1 and 1:1, preferably between 10:1 and 4:1. The ratio of chromium, molybdenum or tungsten to the ionic compound, RX, should be between 10:1 and 0.1:1, preferably between 5:1 and 0.5:1. Ratios of the Group I-III metal of the third component, the organometallic activator, to the second component should be between 40:1 and 1.5:1, preferably between 20:1 and 4:1.

Any order of addition of components is permissible. The components are usually combined at temperatures which allow the formation of an active catalyst species. The temperature may range between about −35°C. and 100°C., preferably between 0°C. and 80°C. Pressures will vary between 0.01 atm. and 500 atm. preferably 0.1 atm. and 300 atm. The three components usually react immediately; in some cases a short induction period of a few seconds to several minutes is necessary.

The reaction proceeds most effectively within a solvent, and the reacting olefin itself may act as a solvent; the solvent should be inert in nature and is preferably organic. Typical solvents which may be utilized are C$_1$–C$_{15}$ alkanes, C$_6$–C$_{20}$ aromatics, C$_1$–C$_{10}$ haloalkanes, C$_6$–C$_{15}$ haloaromatics and C$_6$–C$_{15}$ polyhaloaromatics and C$_2$–C$_{20}$ haloalkenes which have at least one halogen substituted on the double bond. Examples of solvents which may be used are pentane, hexane, decane, benzene, xylene, carbontetrachloride, dichloromethane, chlorobenzene, bromobenzene, tetrachlorobenzene, tetrachloroethylene and trichloroethylene.

Modifiers may be added to the catalyst mixture to vary the type of reaction, reaction rate, or selectivity of the reaction. Typical modifiers would include the various monodentate, bidentate, and tridentate Lewis bases, e.g., ethers, phosphines, tertiary amines. They can be used in stoichiometric amounts compared with the organoaluminum activator or less.

In more detail, the instant invention pertains to a novel catalyst, means for preparing such catalyst, and the use of said catalyst in the disproportionation of olefins.

The preferred combinations of catalyst, ionic compound and activator are as follows: preferable polynuclear transition metal carbonyl complexes are those containing molybdenum or molybdenum and a Group VII transition metal like manganese or rhenium; typical examples of these are Na$_2$[Mo$_2$CO$_{10}$]; (N(n—C$_4$—H$_9$)$_4$)$_2$[Mo$_2$CO$_{10}$], N(n—C$_4$H$_9$)$_4$[MoMn CO$_{10}$];

preferable ionic compounds are the tetraalkylammonium chlorides; more preferable are tetra-n-butylammonium chloride and methyl-tricaprylammonium chloride; preferable activators are the alkylaluminum dihalides or the alkylaluminum sesquihalides; more preferable activators are methylaluminum dichloride and methylaluminum sesquichloride.

A preferable combination contains $Na_2[Mo_2CO_{10}]$, $N(n-C_4H_9)_4Cl$ and methylaluminum dichloride in molar ratios (calculated for monomeric form) of 1.0 : 0.5 : 8.0 or 1.0 : 1.0 : 8.0 or 1.0 : 0,5 : 10. Many other variations are possible.

Following the formation of the catalyst, suitable olefins may be added directly in order to commence the disproportionation reaction. The catalyst may be generated in the presence of the reacting olefins.

The catalyst may also be deposited on an inert solid support such as silica or alumina and fixed on the support by suitable heat treatment up to 700°C.

The basic formula for the homo disproportionation of an olefin is as follows:

$$\overset{A}{2R_1(R_2)C\ CR_3(R_4)} \rightarrow \overset{B}{R_1(R_2)C\ CR_1(R_2)} + \overset{C}{R_3(R_4)C\ CR_3(R_4)}$$

In the above reaction $R_1$, $R_2$, and $R_3$ and $R_4$ may be selected from the group consisting of $C_1$ to $C_{30}$ alkyl, aryl, alkenyl, alkaryl, aralkyl, cycloalkyl, cycloalkenyl and hydrogen. Additionally, halogenated derivatives of any of the preceding compounds may also be utilized provided that the halogen is more than two carbon atoms removed from the double bond; at least one of the group consisting of $R_1$, $R_2$, and $R_3$ and $R_4$ is an aryl radical or an $R'-CH_2$ radical wherein $R'$ is an alkyl, aryl, alkenyl, alkaryl, aralkyl, cycloalkyl or cycloalkenyl radical or a hydrogen atom. Halogenated derivatives of any of the aforesaid radicals may be utilized providing that the halogen is greater than 2 carbons removed from the double bond.

More particularly, $R_1$, $R_2$, $R_3$ and $R_4$ may be selected from the group consisting of $C_1$ to $C_{30}$ alkyl, $C_6$ to $C_{20}$ aryl including those aryls in which two aromatic rings are condensed, $C_2$ to $C_{30}$ alkenyl but not conjugated dienes, $C_7$ to $C_{20}$ alkaryls, $C_7$ to $C_{20}$ aralkyl, $C_3$ to $C_{20}$ cycloalkyl, $C_3$ to $C_{20}$ cylcoalkenyl radicals provided that there are no conjugated double bonds within the cyclo alkenyl radical or a hydrogen atom. Again, halogenated derivatives, preferably chlorine, of the previously mentioned radicals may be utilized providing the chlorine or halogen utilized is more than two carbons removed from the double bond.

As previously mentioned, at least one of the said $R_1$, $R_2$, $R_3$ and $R_4$ must be an aryl radical or an $R'-CH_2$ radical wherein $R'$ is a $C_1$ to $C_{30}$ alkyl, a $C_6$ to $C_{20}$ aryl, a $C_2$ to $C_{20}$ alkenyl, $C_7$ to $C_{20}$ alkaryl, a $C_7$ to $C_{20}$ aralkyl, a $C_3$ to $C_{20}$ cycloalkyl or a $C_3$ to $C_{20}$ cycloalkenyl or a hydrogen atom. The most preferred values for $R_1$, $R_2$, $R_3$, and $R_4$ are $C_1$ to $C_{20}$ provided that at least one of said $R_1$, $R_2$, $R_3$, and $R_4$ is an aryl radical or an $R'CH_2$ radical where $R'$ is a $C_1$ to $C_{20}$ alkyl, $C_2$ to $C_{20}$ alkenyl or hydrogen.

Additionally, the catalyst of the instant invention is useful for cross disproportionation; by cross disproporation it is meant those reactions in which a mixture of two different mono- or polyolefins is reacted to form at least one mono or poly olefinic product. At least one of the products obtained is different than either of the reactants. The general concept of cross disproportionation is illustrated by the following formula:

$$R_1(R_2(C = C(R_3)R_4 + R_5(R_6(C = C(R_7)R_8 \rightarrow$$
$$R_1(R_2(C = C(R_7)R_8 + R_1(R_2)C = C(R_6)R_5 +$$
$$R_4(R_3)C = C(R_7)R_8 + R_4(R_3)C = C(R_6)R_5$$

Indicative of the homo disproportionation reaction and the products produced is the following Table.

TABLE

| Reactant | Products | |
|---|---|---|
| A | B | C |
| $2\ R_1(R_2)C=CR_3(R_4)$ | $R_1(R_2)C=CR_1(R_2)$ | $+\ R_3(R_4)C=CR_3(R_4)$ |
| $CH_3CH_2CH_2CH=CH_2$ | $CH_3CH_2CH_2CH=CHCH_2CH_2CH_3$ | $+\ CH_2=CH_2$ |
| $CH_3(CH_2)_{17}CH=CH_2$ | $CH_3(CH_2)_{17}CH=CH(CH_2)_{17}CH_3$ | $+\ CH_2=CH_2$ |
| $CH_3CH_2CH=CHCH_3$ | $CH_3CH_2CH=CHCH_2CH_3$ | $+\ CH_3CH=CHCH_3$ |
| $C_6H_5CH_2CH_2CH=CH_2$ | $C_6H_5CH_2CH_2CH=CHCH_2CH_2C_6H_5$ | $+\ CH_2=CH_2$ |
| $ClCH_2CH_2CH_2CH_2CH=CH_2$ | $ClCH_2CH_2CH_2CH_2CH-CHCH_2CH_2CH_2CH_2Cl$ | $+\ CH_2=CH_2$ |
| 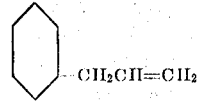-$CH_2CH=CH_2$ | 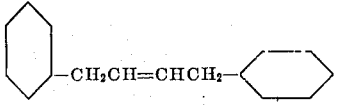-$CH_2CH=CHCH_2$-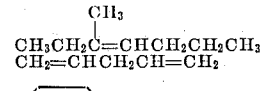 | $+\ CH_2=CH_2$ |
| $\underset{CH_3CH_2\overset{\|}{C}=CHCH_2CH_2CH_3}{CH_3}$ | $CH_3CH_2(CH_3)C=C(CH_3)CH_2CH_3$ | $+\ CH_3CH_2CH_2CH=CHCH_2CH_2CH_3$ |
| $CH_2=CHCH_2CH=CH_2$ | $CH_2=CHCH_2CH=CHCH_2CH=CH_2$ | $+\ CH_2=CH_2$ |
| 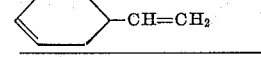-$CH=CH_2$ | -$CH=CH$-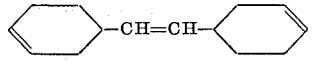 | $CH_2=CH_2$ |

Other disproportionation reactions of the instant invention include the following:

The transformation of a mixture of an acyclic mono- or polyolefin and a cyclic mono or polyolefin in such a way as to form a new acyclic polyolefin of higher molecular weight than the starting materials. A general equation for such a reaction would be

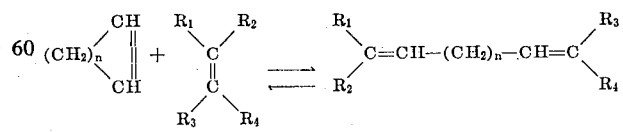

In this case $n$ is an integer varying from 2 to 30. The reverse of this reaction may also be carried out; thus one may employ an acyclic polyolefin as a starting material and can obtain a cyclic mono or polyolefin and an acyclic mono or polyolefin of lesser molecular weight than the starting material as products.

The transformation of one or more cyclic mono- or polyolefins in such a manner that a new cyclic polyene of higher molecular weight is produced. A general equation for such a reaction would be

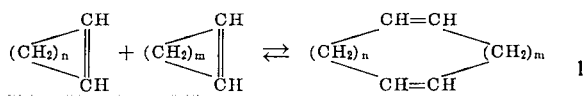

In this case $n$ and $m$ are integers which may vary from 2 to 30 and they may either be the same or different. It is understood that in this reaction the products may react further in a similar manner to form materials of higher molecular weight.

The transformation of one or more acyclic polyolefins so as to form cyclic mono- or polyolefins and acyclic mono- or polyolefins. A general equation for such a reaction would be:

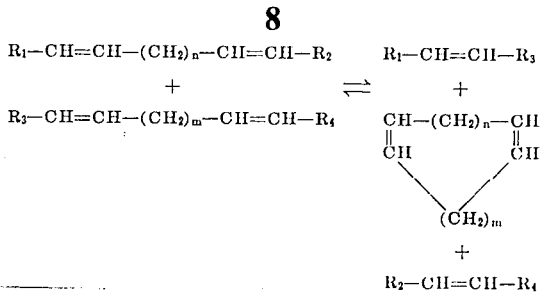

In this case $n$ and $m$ are integers and may vary from 1 to 20 and may be either the same or different from each other.

In the above equations $R_1$ through $R_4$ are selected from the group consisting of alkyl, aryl, alkenyl, alkaryl, aralkyl, cycloalkyl, cycloalkenyl, halogen derivatives of the aforesaid and hydrogen. It is preferred that $R_1$ through $R_4$ be selected from the group consisting of $C_1$ through $C_{20}$ alkyl, $C_6$ to $C_{20}$ aryl, $C_2$ to $C_{20}$ alkenyl, $C_7$ to $C_{20}$ alkaryl, $C_7$ to $C_{20}$ aralkyl, $C_3$ to $C_{20}$ cycloalkyl and $C_3$ to $C_{20}$ cycloalkenyl, halogen derivatives thereof, preferably chlorine.

Typical reactants and products which illustrate the preceding reactions are as follows:

TABLE

| Reactants | Products |
|---|---|
| $CH_3CH_2CH_2CH=CHCH_2CH_2CH_3 + CH_3CH=CHCH_3$ | $CH_3CH_2CH_2CH=CHCH_3$ |
| $CH_3CH_2CH=CH_2 + CH_3CH_2CH_2CH=CHCH_3$ | $CH_3CH=CH_2 + CH_3CH_2CH_2CH=CH_2 + CH_3CH_2CH_2CH=CHCH_3 + CH_3CH_2CH_2CH=CHCH_2CH_3$ |
| $CH=CH_2 + CH_3CH=CHCH_3$ | $CH=CH-CH_3 + CH_2=CHCH_3$ |
| $CH_2CH=CH_2 + CH_3CH=CHCH_3$ | $CH_2CH=CHCH_3 + CH_2=CHCH_3$ |
| $CH_3\underset{|}{C}=CH-\underset{|}{CH}-CH_3 + CH_3CH=CHCH_3$ with $CH_3$ groups | $CH_3-\underset{|}{C}=CHCH_3 + CH_3CH=CH-CH_2-\underset{|}{C}-CH_3$ with $CH_3$ groups |
| $CH_2=CHCH_2CH_2CH=CH_2 + CH_3CH_2CH_2CH=CH_2$ | $CH_2=CHCH_2CH_2CH=CHCH_2CH_2CH_3 + CH_2=CH_2$ |
| $ClCH_2CH_2CH_2CH=CH_2 + CH_3CH=CHCH_3$ | $ClCH_2CH_2CH_2CH=CHCH_3 + CH_2=CHCH_3$ |
| Cyclopentene + $CH_2=CH_2$ | $CH_2=CHCH_2CH_2CH_2CH=CH_2$ |
|  + $CH_3CH=CHCH_2CH_3$ | $CH_3CH=CH-CH_2CH_2CH_2CH=CHCH_2CH_3$ |
| 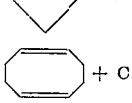 + $CH_2=CH_2$ | $CH_2=CHCH_2CH_2CH=CH_2$ |
| $CH_2=CHCH_2CH_2CH_2CH_2CH=CH_2$ | 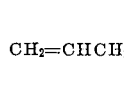 + $CH_2=CH_2$ |
| $CH_2=CHCH_2CH=CHCH_2CH=CH_2$ |  + $CH_2=CH_2$ |
| $CH_2=CH\underset{|}{CH_2}CH-CH_2CH_2-CH=CHCH_3$ with $CH_3$ | $CH_3-$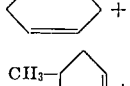 + $CH_2=CHCH_3$ |
| 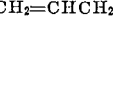 | $[(CH_2CH=CHCH_2CH_2)_n]$  $n \geq 2$ |
|  | $[(CH_2CH_2CH_2CH_2CH_2CH=CHCH_2CH_2CH_2CH_2CH_2)_n]$  $n \geq 2$ |

Reaction conditions for using the catalysts of the instant invention vary dependent upon the type of reactants used. That is to say the reactants are contacted at temperatures of $-100°$ to $+300°C$, preferably $-20°C$. to $150°C$. at pressures which may range from 0.01 to 1,000 atmospheres, preferably 0.1 to 300 atmospheres. Contact times may vary between 0.1 minutes and several days, preferably between 0.2 and 12 hours. The reactants should be contacted in the liquid phase within one or several solvents, preferably organic solvents. Other solvents include inorganic solvents that help to solubilize the catalyst system of the instant invention. In many cases the reactant can be used as solvent or cosolvent. Typical solvents which may be utilized are the $C_1$ to $C_{15}$ alkanes, $C_6$ to $C_{10}$ aryls, halogenated $C_1$ to $C_{10}$ alkanes, $C_6$ to $C_{15}$ haloaryls and certain haloalkenes. Specific examples of solvents include pentane, hexane, decane, benzene, xylene, carbon tetrachloride, methylchloride, methylene chloride, tetrachloroethylene, trichloroethylene, chlorobenzene, tetrachlorobenzene. A wide range of ratios of reactants to catalysts may be employed. Ratios of reactant to catalyst from 10:1 to 10,000:1 on a molar basis may be used with preferred ratios of from 100:1 to 1000:1.

The reactions should be generally carried out under inert atmosphere, e.g., under argon, nitrogen, helium, methane, natural gas. At elevated temperatures it may be necessary to stabilize the catalyst by maintaining a partial pressure of, e.g., carbon monoxide. For purposes of maintaining catalyst activity and selectivity it may be necessary in some cases to have other normally gaseous compounds as additives in the reaction mixture e.g., $CO_2$, $SO_2$, hydrogen.

In addition to the aforementioned use of the catalyst of the instant invention for the disproportionation of olefins it can further be used for the disproportionation of alkynes, e.g., the conversion of pent-2-yne to but-2-yne and hex-3-yne. Other uses of the instant catalysts include the isomerization of olefins, the dimerization and codimerization of olefins, the oligomerization of olefins, the polymerization of olefins where the olefin can be a mono-olefin, diolefin or a double bond in a polymer chain.

The catalysts of the instant invention can be used to prepare a wide variety of commercially important intermediates for the chemical industry, e.g., the production of cyclohexene from 1,7-octadiene, the production of $\alpha$ olefins from internal olefins and ethylene. They can be used to prepare polymers from e.g. cyclic olefins which give novel, outstanding rubbers. The catalysts of the instant invention have outstanding ability to modify the molecular weight and/or other physical properties of polymers containing unsaturation. They can be used in the petroleum area for the upgrading of refinery streams.

SPECIFIC EXAMPLES

EXAMPLES 1-16

Disproportionation of Pentene-1 Using $A_2^+$ $[M_2(CO)_{10}]^{2-}$

In the general procedure the complex salt was stirred with 5 ml chlorobenzene followed by addition of 5 ml pentene-1. Subsequently, the ionic compound was added, generally tetra-n-butylammonium chloride, followed by the organoaluminum compound as activator. The reaction was carried out over a period of time, and then generally terminated by flash distillation of the product in vacuo. Analysis of the products by G.C. was carried out and the percent of octenes was listed on a solvent free basis. Cation A consisted of Na and tetra-n-butyl ammonium derivatives of the general formula $NR_4$, M was selected from the group consisting of molybdenum and tungsten. All reactions took place in glass vessels.

TABLE I.—DISPROPORTIONATION OF PENTENE-1 AT AMBIENT TEMPERATURE

| Polynuclear transition metal carbonyl-complex salt | | Ionic compound $NR_4Cl$ (mM.) | Organometallic activator (mM.) Al | Reaction time (hrs.) | Conversion to octenes (percent wt.) | Remarks |
|---|---|---|---|---|---|---|
| Cation [A+] | Transition metal [M] (mM. complex) | | | | | |
| $NR_4$ | Mo (0.25) | 0.25 | $MeAlCl_2$ (5) | 2 | 64.4 | |
| $NR_4$ | Mo (0.5) | | $MeAlCl_2$ (4) | 1 | 4.3 | |
| $NR_4$ | W (0.25) | 0.25 | $MeAlCl_2$ (4) | 3 | 36.1 | |
| $NR_4$ | Mo (0.25) | 0.12 | $MeAlCl_2$ (4) | 2 | 64.5 | |
| $NR_4$ | Mo (0.25) | 0.50 | $MeAlCl_2$ (4) | 2 | 72.6 | |
| $NR_4$ | Mo (0.25) | 0.25 | $MeAlCl_2$ (4) | 2 | 35.1 | |
| $NR_4$ | Mo (0.125) | 0.16 | $MeAlCl_2$ (2.5) | 2 | 59.6 | |
| $NR_4$ | Mo (0.133) | 0.08 | $MeAlCl_2$ (2.5) | 2 | 49.5 | |
| $NR_4$ | Mo (0.0625) | 0.065 | $MeAlCl_2$ (1.25) | 2.5 | 41.8 | |
| Na | Mo (0.130) | 0.07 | $MeAlCl_2$ (2.5) | 2 | 70.6 | |
| Na | Mo (0.126) | 0.03 | $MeAlCl_2$ (2.5) | 2 | 41.9 | |
| Na | Mo (0.129) | 0.125 | $MeAlCl_2$ (2.5) | 2.5 | 60.8 | |
| Na | Mo (0.127) | 0.07 | $(Me_3Al_2Cl_3)$ (1.25) | 2 | 29.4 | |
| Na | Mo (0.0625) | 0.03 | $MeAlCl_2$ (1.25) | 2 | 45.2 | |
| Na | Mo (0.125) | 0.06 | $EtAlCl_2$ (2.5) | 2 | 29.4 | |
| Na | Mo (0.125) | 0.06 | $MeAlCl_2$ (2.5) | 2 | 53 | Benzene as solvent. |

NOTE: $R = n\text{-}C_4H_9$. Chlorobenzene as solvent except where indicated.

EXAMPLE 17

Disproportionation of Pentene-1 at Low Temperature

A mixture of 0.123 mM$(N(nC_4H_9)_4)_2Mo_2(CO)_{10}$ and 38 mg $N(C_4H_9)_4Cl$ was stirred in a solution of 6 ml chlorobenzene and 5 ml pentene-1 at 0°C. Subsequently 1 ml of a 2.5 molar solution of methylaluminum dichloride in chlorobenzene was added. Within 4 hrs. at 0°C 221 ml ethylene were collected indicating 43 percent disproportionation.

EXAMPLE 18

Disproportionation of Octene-1 at 70°C

A mixture of 0.126 mM $Na_2Mo_2(CO)_{10}$ and 14 mg $N(n\text{-}C_4H_9)_4Cl$ were stirred at ambient temperature with a solution of 6 ml chlorobenzene and 5 ml octene-1. The mixture was heated to 70°C and then reacted with 1 ml = 2.5 mM methylaluminum dichloride. Within ½ hr. a total of 157 ml ethylene was obtained, indicating 44 percent disproportionation.

EXAMPLE 19

Disproportionation of a Diolefin: 1,7 Octadiene

A mixture of 0.130 mM Na$_2$Mo$_2$(CO)$_{10}$ and 19 mg N(nC$_4$H$_9$4Cl was stirred with a solution of 5 ml 1,7-octadiene and 6 ml chlorobenzene. Subsequently at ambient temperature one ml of a 2.5 molar solution of methylaluminum dichloride in chlorobenzene were added. A substantial amount of ethylene was evolved. After a reaction time of 6 hrs. all volatiles were stripped by flash evaporation and collected in a dry ice trap. Analysis of the distillate gave 43.6 percent cyclohexene (on a solvent free basis).

EXAMPLE 20

Disproportionation of a Branched Olefin

A mixture of 0.133 mM Na$_2$ Mo$_2$(CO)$_{10}$ and 19.5 mg N(n—C$_4$H$_9$)$_4$Cl were stirred with a solution of 6 ml chlorobenzene and 4methylpentene-1. After addition of 2.5 mM methylaluminum dichloride in chlorobenzene at ambient temperature the reaction commenced as evidenced by gas evolution. After 2 hours the reaction was terminated. Measurement of the gas evolution as well as analysis of the liquid products indicated 24 percent disproportionation.

Example 21

Disproportionation - Polymerization of Cyclopentene

A mixture of 0,25 mM(N(n-C$_4$H$_9$)$_4$)$_2$Mo$_2$(CO)$_{10}$ and 69 mg N(n-C$_4$H$_9$)$_4$Cl were stirred with 10 ml cyclopentene and 10 ml chlorobenzene. Subsequently 2 ml of a 2.5 molar solution of methylaluminum dichloride were added and the reaction vigorously stirred. After 5 minutes the solution becomes viscous, after 7 minutes the solution appeared to gel. After 15 minutes the catalyst was killed by adding a solution of an antioxidant (n-phenyl 2-naphthylamine) in isopropanol (10 ml), followed by addition of a mixture of 10 ml chlorobenzene and 10 ml xylene. The high molecular weight polymer was then precipitated by pouring the solution into a mixture of 350 ml methanol and 350 ml isopropylalcohol. The solid polymer was recovered by filtration, and subsequently redissolved and precipitated for purposes of purification. Yield of polymer: 13 percent. Average molecular weight of the polymer (as determined by membrane osmometry) 186,000.

EXAMPLE 22

Disproportionation and Isomerization of Pentene-1

A mixture of 0.127 mM Na$_2$[Mo$_2$(CO)$_{10}$] and 16 mg (n—C$_4$H$_9$)$_4$NCl was stirred with a solution of 5 ml pentene-1 and 6 ml chlorobenzene. Subsequently the catalyst was activated with 1 ml of a 2.5 molar solution of methylaluminum sesquichloride. After carrying out the reaction for 2 hrs. all volatiles were flash distilled and the distillate (9g) was analyzed by gas chromatography. On a solvent free basis were found (percent weight): 39.3 pentene-1, 10.0 trans pentene-2, 3.3 cis pentene-2,1.0 C$_7$ olefin, 46.4% C$_8$ olefins. This shows that the catalyst is not only active for disproportionation but also for olefin isomerization.

EXAMPLE 23

Disproportionation of Octene-1 at 85°C using a dinuclear catalyst containing two different transition metals.

167.1 mg of the complex N(n-C$_4$H$_9$)$_4$ [MoMn(CO)$_{10}$] were stirred with 4 ml chlorobenzene, 5 ml Octene-1 and 2 ml of a chlorobenzene solution containing 0.126 millimoles N(n-C$_4$H$_9$)$_4$Cl at 85°C. Subsequently 1 ml of a chlorobenzene solution was added containing 2.5 millimoles methylaluminum dichloride. Immediately the reaction started as evidenced by the evolution of ethylene. In 18 minutes 157 ml of ethylene were evolved indicating 43.5 percent disproportionation.

EXAMPLE 24

Disproportionation of pentene-1 in presence of a Lewis Base 61.7 mg (equal to 0.12 millimoles) of the compound Na$_2$[Mo$_{b6}^{(CO)}{}_{10}$] was stirred at room temperature with 4 ml chlorobenzene, 5 ml pentene-1, 1 ml of a chlorobenzene solution containing 0.063 millimoles of N(n-C$_9$H$_9$)$_4$Cl and as a Lewis Base additive 0.25 millimoles of triphenylphosphine. Subsequently 1 ml of a 2.5 molar solution of methylaluminum dichloride in chlorobenzene was added and the disproportionation commenced with the evolution of ethylene. After 2 hrs. 295 ml ethylene had been obtained indicating 57 percent disproportionation.

EXAMPLE 25

Disproportionation of pentene-1 in presence of a bidentate Lewis Base 68.2 mg (equal to 0.132 millimoles) of the complex Na$_2$[Mo$_{b6}^{(CO)}{}_{10}$] were stirred with 0.063 millimoles N(n—C$_4$H$_9$)$_4$Cl in 1 ml of chlorobenzene, 4 'ml of chlorobenzene and 5 ml pentene-1. One ml of a solution containing 0.25 millimoles of tetramethylethylenediamine (TMEDA) was then added. Subsequently the reaction was started by adding 1 ml of a 25 molar solution of methylaluminum dichloride. Within 2 hrs. 310 ml of ethylene were obtained representing 59 percent disproportionation.

EXAMPLE 26

Disproportionation of pentene-1 with a mixed dinuclear catalyst 83.5 (equal to 0.124 millimoles) of the complex N(n—C$_4$H$_9$)$_4$ [MoMn (CO)$_{10}$] is stirred with 4 ml chlorobenzene, ml. pentene-1 and 2 ml of a chlorobenzene solution containing 0.126 millimoles of N(n-C$_4$H$_9$)$_4$Cl. The disproportionation is started by adding 1 ml of a 2.5 molar solution of a methylaluminum dichloride in chlorobenzene as evidenced by evolution of ethylene. After two hours the reaction is terminated. G. C. Analysis indicates 17.2 percent octenes (on a solvent free basis).

EXAMPLE 27

Disproportionation of an internal olefin at ambient temperature 66.9 mg (equal to 0.129 millimoles) of the dinuclear complex Na$_2$[Mo$_2$(CO)$_{10}$] are stirred with 5 ml chlorobenzene, 5 ml heptene-3 and 1 ml of a 0.063 molar solution of N(n—C₄H₉)₄Cl in chlorobenzene. The activation is done subsequently by adding 1 ml of a 2.5 molar solution of methylaluminum chloride in chlorobenzene. After 2 hours reaction time all volatiles are flashed off in vacuo. G. C. Analysis (on a solvent free basis) showed 17.5 percent hexenes and 19 percent octenes.

EXAMPLE 28

Codisproportionation of butene-2 with Octene-4

67 mg of the Complex Na₂[Mo₂(CO)₁₀] are stirred with 5 ml chlorobenzene, 5 ml octene-4 and 10 ml butene-2 mixture, followed by the addition of 19 mg N(n-C₄H₉)₄Cl at −5°C. Subsequently, the reaction is started by adding 1 ml of a 2.5 molar solution of methylaluminum dichloride in chlorobenzene. The flask is sealed and warmed to ambient temperature. After 12 hours reaction time the reaction is terminated and all volatile material flashed off in vacuo. G. C. Analysis shows 14 percent hexenes (on a solvent free basis) indicating that the codisproportionation took place.

EXAMPLE 29

Codisproportionation of ethylene with Octene-4

The same catalyst composition as in Example 28 was used for this run. In this case, 10 ml octene-4 was used. The autoclove was pressurized with 1,000 psi ethylene. Immediately the pressure started dropping. After 16 hrs. reaction at ambient temperature the reaction was terminated. The product was worked up as in the previous example. G. C. Analysis showed 21 percent pentenes.

EXAMPLE 30

Disproportionation of pentene-1 with rhenium-molybdenum complex 84 mg of the complex N(C₂H₅)₄[ReMO(CO)₁₀] were stirred at ambient temperature with 4 ml chlorobenzene, 5 ml pentene-1 and 0.062 millimoles N(n—C₄H₉)₄Cl. Upon addition of 1 ml of a 2.5 molar solution of methylaluminum dichloride the reaction started as evidenced by gas evolution. After 2 hours the reaction was terminated and the volatile products were removed in vacuo. G. C. Analysis showed 25 percent octenes (on a solvent free basis).

What is claimed is:

1. A process for preparing a catalyst which comprises contacting a polynuclear transition metal carbonyl complex having the general formula $$A_n(MM'(CO)_qL_m)^-_n$$

wherein A is a cation selected from the group consisting of alkali metals and cations having the general formula $D_4Q$ wherein D is selected from a group consisting of $C_1$–$C_{20}$ hydrocarbyl radicals and halogenated derivatives thereof and Q is selected from the group consisting of nitrogen, phosphorus and arsenic; M is a Group VI-B metal; M' is a metal selected from the group consisting of Group VI-B and Group III transition metals; L is a unidentate or bidentate ligand selected from the group consisting of CO, NH₃, hydrazine, phenylhydraxine, cyclohexylamine, N-butylamine, dimethylamine, aniline, diethylamine, pyridine, 2,6-dimethylpyridine, triphenylarsine, tributylstibine, triphenylstibine, dimethylsulfoxide, dimethylcyanamide, N-cyanopiperidine, triphenylphosphine imine, ethylenediamine, tetramethylethylenediamine, 2,2'-dipyridyl, 1,10-phenanthroline, 2,7-dimethyl-1,8-naphthyridine, piperidine, piperazine, acetonitrile, propionitrile, acrylonitrile, triphenylphosphine, triphenylphosphine oxide, triphenyl phosphite, tricyclohexylphosphine triphenylarsine, tri(p-tolyl)arsine, 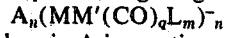-tolyl)arsine, tetramethyldiphosphine, 1,2-bis(diphenylphosphine (diphenylphosphine) ethane, 1,2-bis(diphenylarsino)ethane, 0-phenylene bis(dimethylarsine), diethylenetriamine, bis(2-methoxyethyl)ether, 2,5,8-trithianonane, tris(diphenylphosphinomethyl)ethane, and tetrakis(diphenylphosphinomethyl)methane; q is an integer of from 0 to 14; m is an integer varying from 0 to 2, and wherein L must be CO when q is equal to 0; n is an integer of from 1 to 2 and equal to the valence of the carbonylanion; with an ionic compound of the type RX wherein X is a halide and R is selected from the group consisting of compounds having the general formula $D_4Q$ wherein D is selected from the group consisting of $C_1$–$C_{20}$ hydrocarbyl radicals and halogenated derivatives thereof and Q is nitrogen, phosphorus or arsenic, and an organometallic activator, said organometallic activator comprising organoaluminum halides selected from the group consisting of compounds having the general formulas $R'AlY_2$ and $R'_3Al_2Y_3$ wherein R' is selected from the group consisting of hydrogen and $C_1$–$C_{20}$ hydrocarbyl radicals $C_1$–$C_{20}$ oxyhydrocarbyls and wherein at least one R' is a hydrocarbyl radical, and Y is a halide, said contacting taking place at a temperature of from −35°C to 100°C and a pressure of from about 0.01 atmospheres to 500 atmospheres, the atomic ratio of the metal of the organometallic activator to the Group VI-B metal of the metallic complex varying from about 20:1 to 1:1 and the molar ratio of the Group VI-B metal to said ionic compound varying from 10:1 and 0.1:1, whereby a catalyst is formed.

2. The process of claim 1 wherein the contacting takes place in an inert solvent, and at a temperature of from 0° to 80°C and at a pressure of from 0.1 atmospheres to 300 atmospheres.

3. The process of claim 1 wherein the organometallic activators are selected from the group consisting of methylaluminum dichloride and methylaluminum sesquichloride.

4. The process of claim 1 wherein both M and M' are Mo.

5. The process of claim 1 wherein said ionic compound, RX, is a chloride.

6. The process of claim 1 wherein the inert solvent is selected from the group consisting of $C_1$–$C_{15}$ alkanes, $C_6$–$C_{20}$ aromatics, $C_1$–$C_{10}$ haloalkanes, $C_1$–$C_{10}$ polyhaloalkanes, $C_6$–$C_{15}$ haloaromatics, $C_6$–$C_{15}$ polyhaloaromatics, $C_2$–$C_{20}$ haloalkenes, having at least one halogen substituted on the double bond.

7. The process of claim 1 wherein said polynuclear transition metal carbonyl complex is selected from the group consisting of compounds having the anions [Mo₂(CO)₁₀]²⁻; [W₂(CO)₁₀]²⁻; [Cr₂(CO)₁₀]²⁻; MoMn(CO)₁₀⁻; [MoRe(CO)₁₀]⁻; and [WRe(CO)₁₀]⁻.

8. The product of claim 1.

* * * * *